(No Model.) 2 Sheets—Sheet 1.
E. F. McINTYRE.
PLOW STANDARD.
No. 372,228. Patented Oct. 25, 1887.
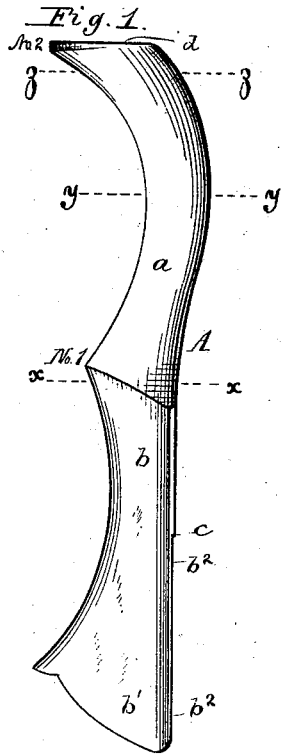
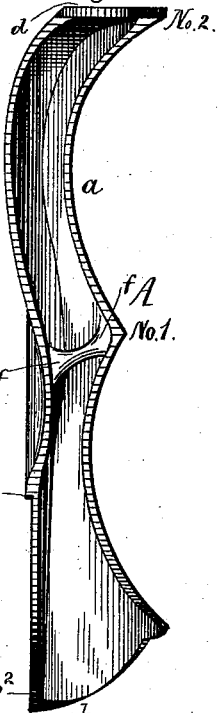
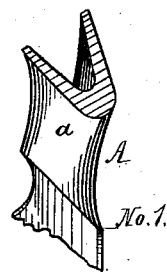
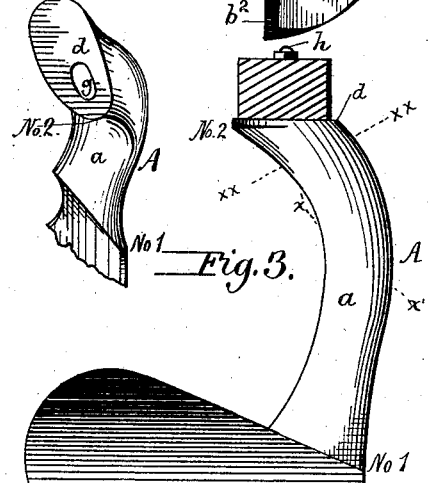
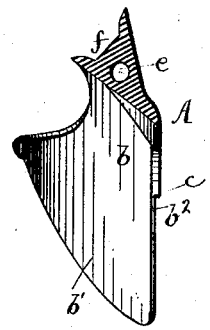
Witnesses:
B. C. Fenwick.
Robt. L. Fenwick.
Inventor:
Edgar F. McIntyre
by his attys
Mason, Fenwick & Lawrence

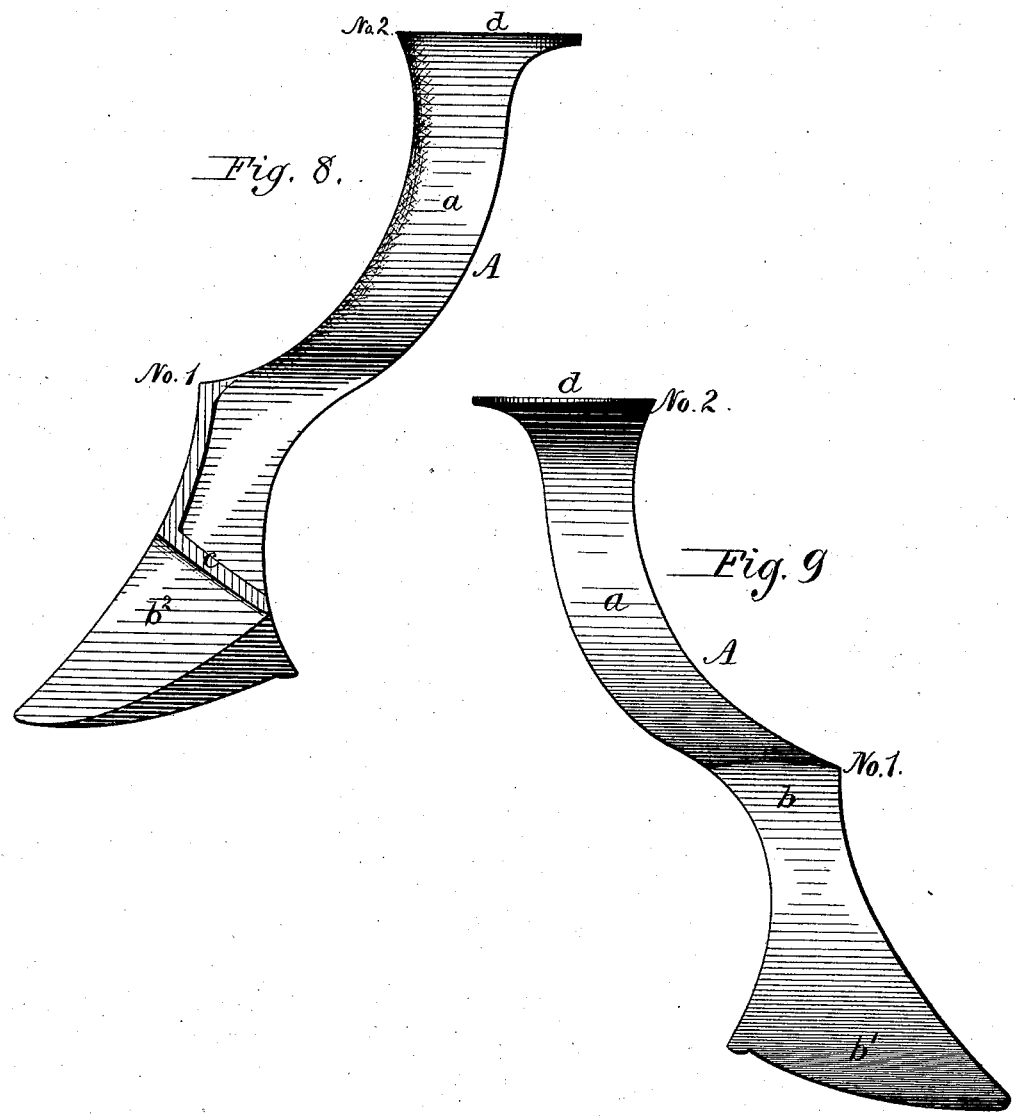

UNITED STATES PATENT OFFICE.

EDGAR F. McINTYRE, OF CHICAGO, ILLINOIS.

PLOW-STANDARD.

SPECIFICATION forming part of Letters Patent No. 372,228, dated October 25, 1887.

Application filed February 21, 1887. Serial No. 228,347. (No model.)

*To all whom it may concern:*

Be it known that I, EDGAR F. MCINTYRE, a citizen of the United States, residing at Chicago, in the county of Cook and State of Illinois, have invented certain new and useful Improvements in Plow-Standards; and I do hereby declare the following to be a full, clear, and exact description of the invention, such as will enable others skilled in the art to which it appertains to make and use the same.

My invention consists in a novel and improved construction, as will be hereinafter described and specifically claimed, of that description of plow-standard which is formed with a curved neck above the mold-board, and thereby facilitates the discharge of weeds, grass, and other foul stuffs upon the furrow side of the plow.

In the accompanying drawings, Figure 1 is a front view of my improved plow-standard, and Fig. 2 a rear view of the same. Fig. 3 is a front view of the said standard connected to a plow-beam, and with mold-board, share, and landside applied in their proper positions. Fig. 4 is a horizontal section in the line $x\ x$ of Fig. 1, looking downward. Fig. 5 is a horizontal section in the line $y\ y$, a portion of the standard below being broken away. Fig. 6 is a horizontal section in the line $z\ z$, looking upward. Fig. 7 is a top view of a portion of the standard. Fig. 8 is a side view of the standard as seen from the land side, and Fig. 9 is a side view of the same as seen from the furrow side.

My plow-standard A, as represented in the accompanying drawings, has its neck portion $a$ crooked or curved between numbers 1 and 2 on the landside, as shown in Fig. 7, as well as in Figs. 1, 2, 3, 8, and 9. From Figs. 1 and 2 it will be seen that the curve on the landside near No. 1 throws the neck inward from the land side of the plow toward the furrow side of the same, also that the remainder of the curve is so slight that the greatest projection—say at $y\ y$—of the standard is only a little beyond the landside. By this construction the necessary curvature for directing the weeds inward over toward the furrow side is secured, and at the same time no land-side projection of the standard which would interfere with the plowshare plowing as deep as desired is presented.

The furrow-side edge of the curved neck $a$ corresponds very closely in shape to the landside curved edge, as is illustrated by the drawings. The standard below No. 1 is formed with surfaces, as $b\ b'\ b^2$, which are adapted to the constructions and forms of the mold-board B, share C, and landside D, which parts are applied upon these surfaces, as illustrated in Fig. 3. Instead of forming the standard between the landside-shoulder $c$ and the beam-head $d$ with a brace which projects out landsideward from near No. 1, I construct it in form of either the letter U or V, as illustrated in Figs. 2, 5, and 6, and so slope and shape the rear surface, as illustrated in said figures, with respect to the landside and beam-head $d$ that, while the rear portion of the U or V of the standard serves to strengthen and act as a stay to the front portion, it does not offer any undue obstruction to the plowshare entering the soil as deep as required. This construction is very light, yet strong and enduring.

The two portions of the U or V standard are tied together about midway of the height of the standard by a cross-lug, $f$, which is cast in relief from the front body of metal by which said portions are united as one piece, thus leaving a passage, $e$, between said metal and the lug. This lug is located near No. 1, and its construction is plainly illustrated in Figs. 2 and 4; and at the top of the standard the said two portions of the U or V construction are tied together by the beam-head $d$, said beam-head having a vertical oblong opening, $g$, through it for the passage of the fastening-bolt $h$ or a fastening and staying rod which connects the plow-standard to the beam.

From the foregoing description it will be seen that my plow-standard is constructed with the neck crooked or curved to the landside of the plow, and then comes back with a rear contortional segmental twist to a center draft, and that it is constructed in horizontal section in the form of about the letter U or V, the united portions of the U or V standard constituting strong supports or braces mutually to each other; also, that the landside brace or support formed by the rear portion of the U or V standard extends back in a parallel line, or very nearly so, with the heel of the landside and runs the whole length of the plow-standard from the beam-head $d$ to the foot of the standard, thereby forming a seat for the landside to be bolted upon; and while this is the case the said rear portion of the U or V standard is a firm stay and brace to the other or front curved neck portion of the standard, it beginning at the front landside edge of said curved neck as a homogeneous part thereof and extending back even with the mold-board rear edge of the same. The curved neck of the standard forms, as usual, a curved guide with a surface similar to the surface of the mold-board for conducting and easing the passage off of weeds, grass, and all foul stuff into the furrow being made by the plow, there to be buried or covered by the furrow-slice as it falls from the mold-board. This weed-guide, as is well known, is very important, as it prevents the choking of the plow between the mold-board and the beam and avoids the necessity of stopping and lifting the plow out of the ground for the purpose of clearing away the clogging matter.

The advantage gained by making the standard of U or V form or with two flanges is this: The standard is braced in two directions, it being formed with two concave sides, one to the landside of the plow and one to the rear of the same, as illustrated in the drawings. The landward side of the plow overcomes the extra strain which would naturally come from having a standard curving to the landward side of the plow. Fig. 3 of my drawings shows the rear and front of the brace of my improved standard, and it being of a concave form resists effectually the immense strain which comes upon the neck $a$ of the plow-standard from the front or cutting edge of the plow, caused by the horses lifting up the end of the plow-beam or by the plow suddenly striking against roots or stones.

Plows with curved necks as heretofore constructed have not to the extent required been able to resist the extra strain caused by the team lifting on the end of the plow-beam, or by the sudden jar caused by the plow striking against obstacles in the ground. Provision has heretofore been made for protecting plow-standards with curved necks against breakage sidewise; but the neck has been left wholly unprotected in rear on account of not having a flange or brace at that part to resist the strains caused by the team lifting on front end of plow-beam. Again, difficulty has been experienced where an auxiliary brace has been provided in a way different from my invention, in this, that the brace by projecting over the landside too far makes the plow side heavy and prevents deep plowing on account of the brace touching the ground on the landward side of the plow. With my invention this difficulty is wholly overcome by the U or V shaped brace-standard, which while being perfectly braced at the curved neck, both landward and rearward, has its bracing portion in a parallel line (or nearly so) with the landside of the plow, and thus allows the plow to do deep plowing, and at the same time lessens side draft by not rendering the plow side-heavy.

From the drawings, Figs. 2 and 4, it will be seen that the lug $f$ forms a cross-bar, upon which a hooking screw-bolt rod (not shown in the drawings) which fastens the beam to the standard may be hooked or fastened, and thus the plow-beam relieved of much of the strain which comes upon the plow-standard when the team lifts on the end of the beam or the share strikes any obstacle in the ground.

While I regard it the most proper way of constructing the standard to have the rear flange extend from the beam-head to the landside-seat, and to form the seat or flange to which the landside, share, and mold-board are fastened, I would say that the plow-standard may be made with the rear brace only running part way down from the head $d$, and yet serve a useful purpose. I would also state that the plow-standard, of U or V form in horizontal section and with the peculiarly crooked and curved neck, may be made light of either cast or wrought metal, malleable iron, or steel; or the lower portion might be of cast metal while the upper part is of wrought metal, or vice versa, and these portions firmly united. I would also state that the cross-lug $f$, forming a cross-bar for the fastening bolt-rod, might be dispensed with and the beam fastened, as usual, by a bolt and nut; but I prefer to provide the plow-standard with said lug. The shape of the standard represented in the drawings is such that the front edge of the standard is rounded and the beam-head does not project over in front, and thus the guiding-throat of the neck is left clear and smooth beneath the plow-beam in front of plow, thus giving the weeds, grass, and foul stuff great freedom to pass along without anything but the friction of the surface on which they move to detain them.

What I claim is—

1. The plow-standard comprising beam-head $d$, guiding and weed-discharging crooked or curved neck portion $a$, and having seats for landside, share, and mold-board, said standard being of U form in horizontal section, and the rear portion of the U-standard being parallel, or nearly so, with the landside, substantially as and for the purpose described.

2. The plow-standard comprising perforated beam-head $d$, guiding and weed-discharging crooked or curved neck portion $a$, and cross-bar $f$, and having seats for landside, share, and mold-board, said standard being of U form in horizontal section, and the rear portion of the U-standard being parallel, or nearly so, with the landside, substantially as and for the purpose described.

3. The combination, in the plow-standard A, of U form in horizontal section, and with its rear portion parallel, or nearly so, with the landside, and having its neck crooked or curved, as at *a*, and provided with seats for landside, share, and mold-board, all as and for the purpose herein described.

In testimony whereof I affix my signature in presence of two witnesses.

EDGAR F. McINTYRE.

Witnesses:
JOHN J. RYAN,
JOHN J. FANNING.